(12) United States Patent
Namuduri et al.

(10) Patent No.: US 12,095,352 B2
(45) Date of Patent: Sep. 17, 2024

(54) SYSTEMS AND METHODS FOR REDUCING BATTERY RIPPLE LOSS

(71) Applicant: GM GLOBAL TECHNOLOGY OPERATIONS LLC, Detroit, MI (US)

(72) Inventors: Chandra S. Namuduri, Troy, MI (US); Suresh Gopalakrishnan, Troy, MI (US); Lei Hao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 238 days.

(21) Appl. No.: 17/826,592

(22) Filed: May 27, 2022

(65) Prior Publication Data

US 2023/0387787 A1 Nov. 30, 2023

(51) Int. Cl.
*H02M 1/14* (2006.01)
*B60L 50/51* (2019.01)
*B60L 50/60* (2019.01)
*H02P 27/08* (2006.01)
*H02M 7/5395* (2006.01)

(52) U.S. Cl.
CPC ............. *H02M 1/143* (2013.01); *B60L 50/51* (2019.02); *B60L 50/60* (2019.02); *H02P 27/085* (2013.01); *H02M 7/5395* (2013.01)

(58) Field of Classification Search
CPC ..... H02M 1/143; H02M 7/5395; B60L 50/60; B60L 50/51; H02P 27/085
USPC ....................................................... 318/139
See application file for complete search history.

(56) References Cited

U.S. PATENT DOCUMENTS

2018/0236882 A1* 8/2018 Wang .................... B60L 15/025

OTHER PUBLICATIONS

Hara et al. (WO 2019150984 A1) "Control Device for Three-Phase Synchronous Electric Motor" Date Published Aug. 8, 2019 (Year: 2019).*
Fujiwara et al. (CN 102625977 A) "Motor System" Date Published Aug. 1, 2012 (Year: 2012).*
Moriya et al. (EP 1206028 A2) Driving Apparatus, Power Output Apparatus, and Control Method Date Published May 15, 2002 (Year: 2002).*
Singh (EP 2686950 B1) System for Controlling Rotary Electric Machines To Reduce Current Ripple on Direct Current Bus Date Published Jun. 9, 2021 (Year: 2021).*
Gallegos et al. (CN 102545763 B) Method, System And Device For Adjusting Pulse Width Modulation (PWM) Waveform Duty Ratio Date Published Aug. 13, 2014 (Year: 2014).*

* cited by examiner

*Primary Examiner* — Jorge L Carrasquillo

(57) ABSTRACT

A power control system for an electric vehicle comprises N power inverters configured to connect to a battery system of the electric vehicle. Each of the N power inverters includes a plurality of power switches, where N is an integer greater than one. The N power inverters are configured to connect to stator phase windings of N electric machines, respectively. A controller is configured to determine a switching frequency for the N electric machines and (N−1) phase offsets for (N−1) ones of the N electric machines, generate a set of pulse width modulation (PWM) switching signals at the switching frequency for a first one of the N power inverters, and output (N−1) sets of PWM switching signals to the (N−1) ones of the N electric machines based on the set of PWM switching signals and the (N−1) phase offsets.

20 Claims, 7 Drawing Sheets

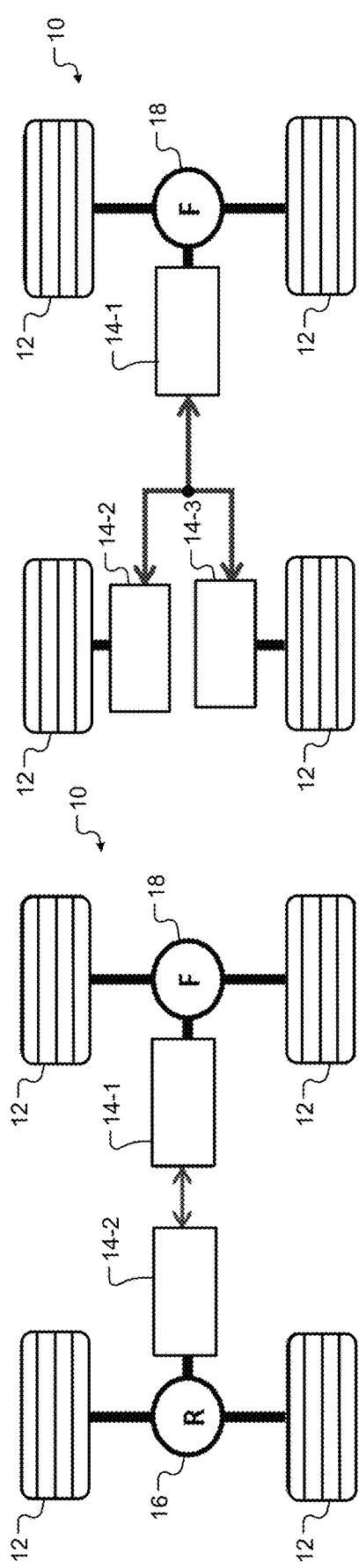
FIG. 1
FIG. 2
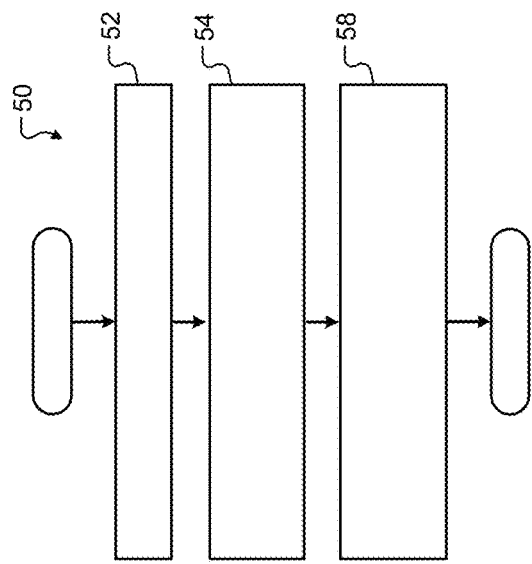
FIG. 4
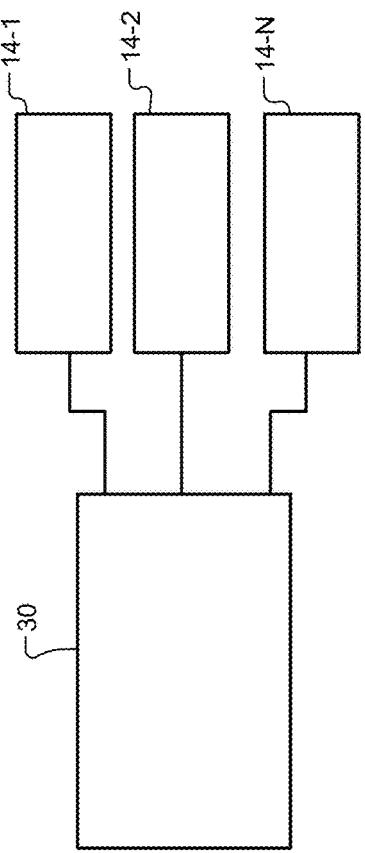
FIG. 3

FIG. 7
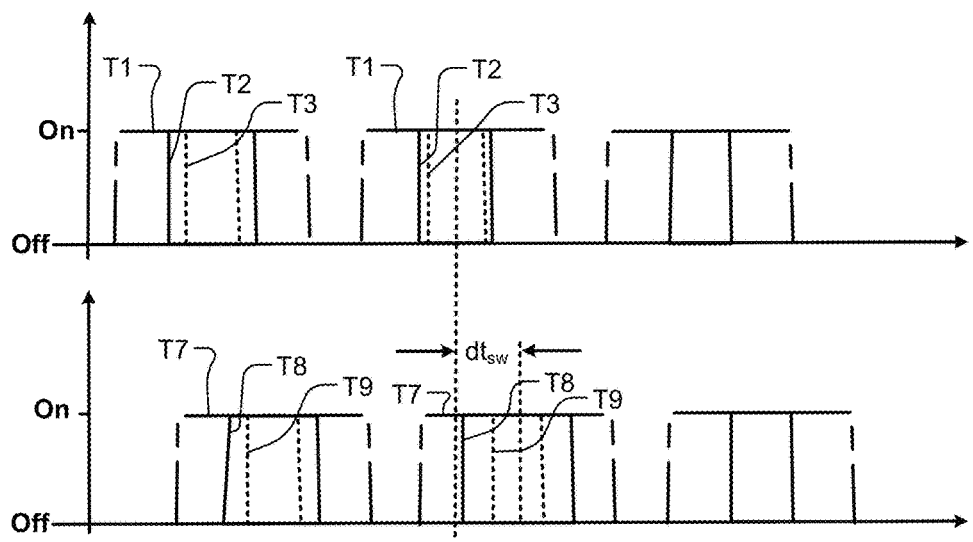
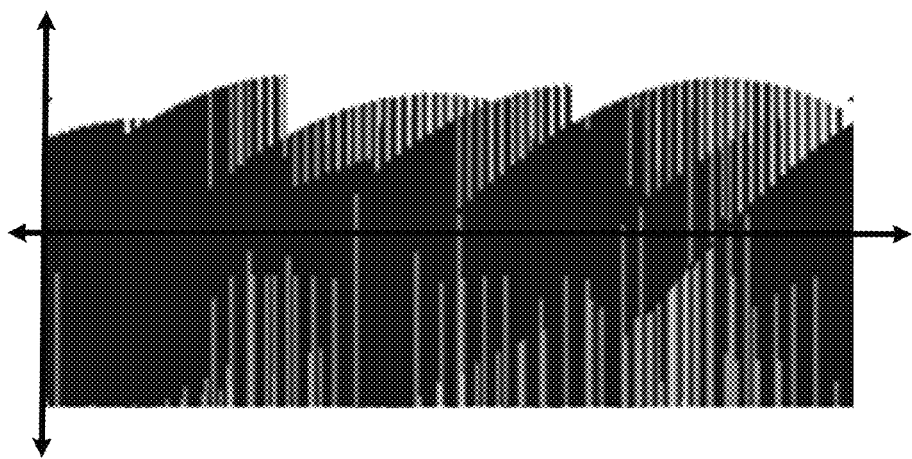
FIG. 8A
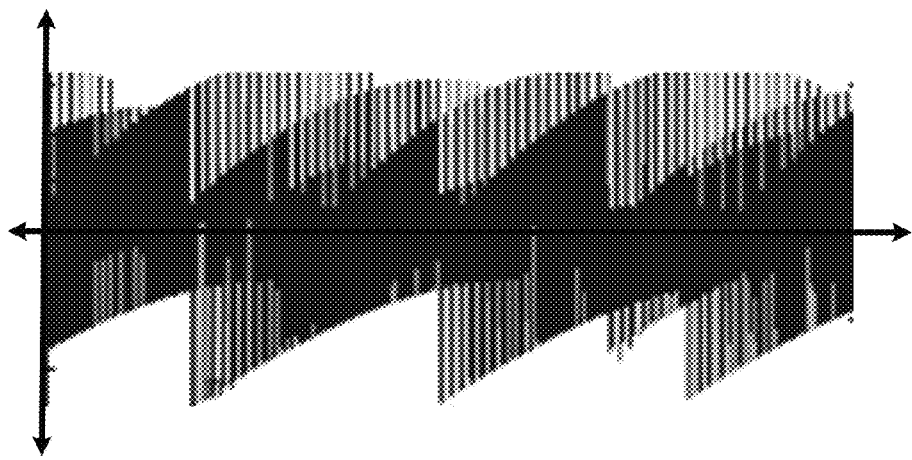
FIG. 8B

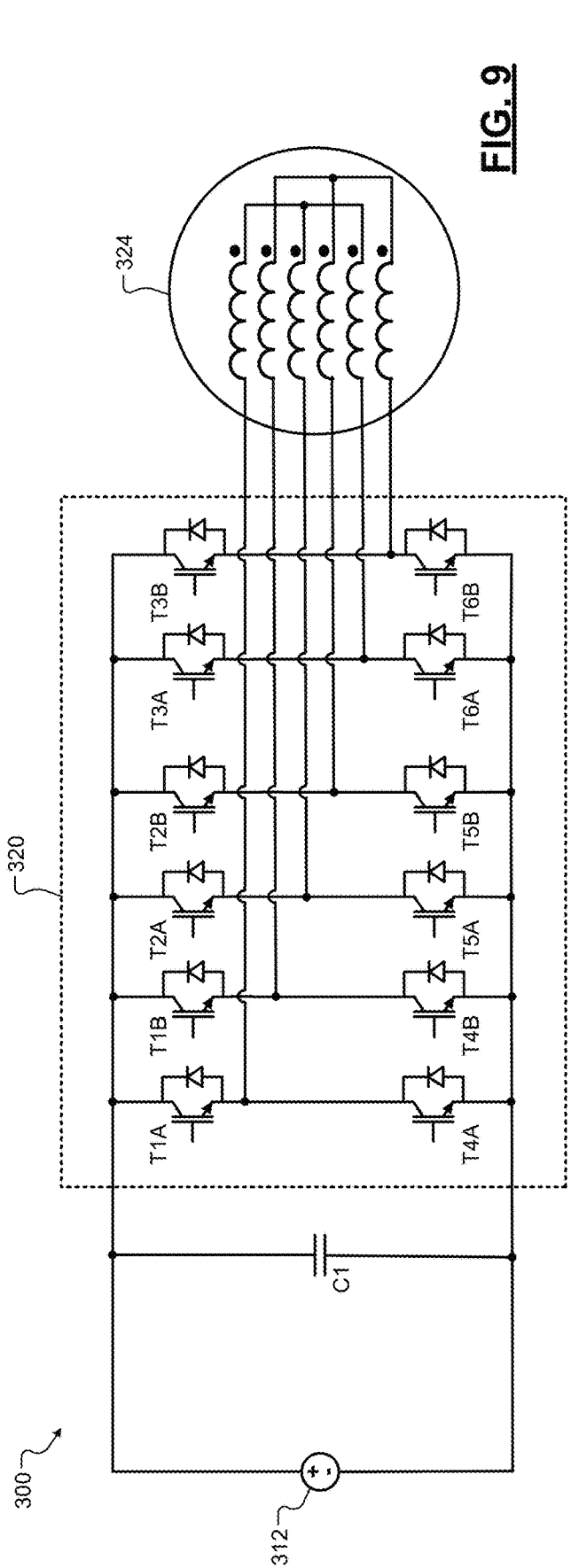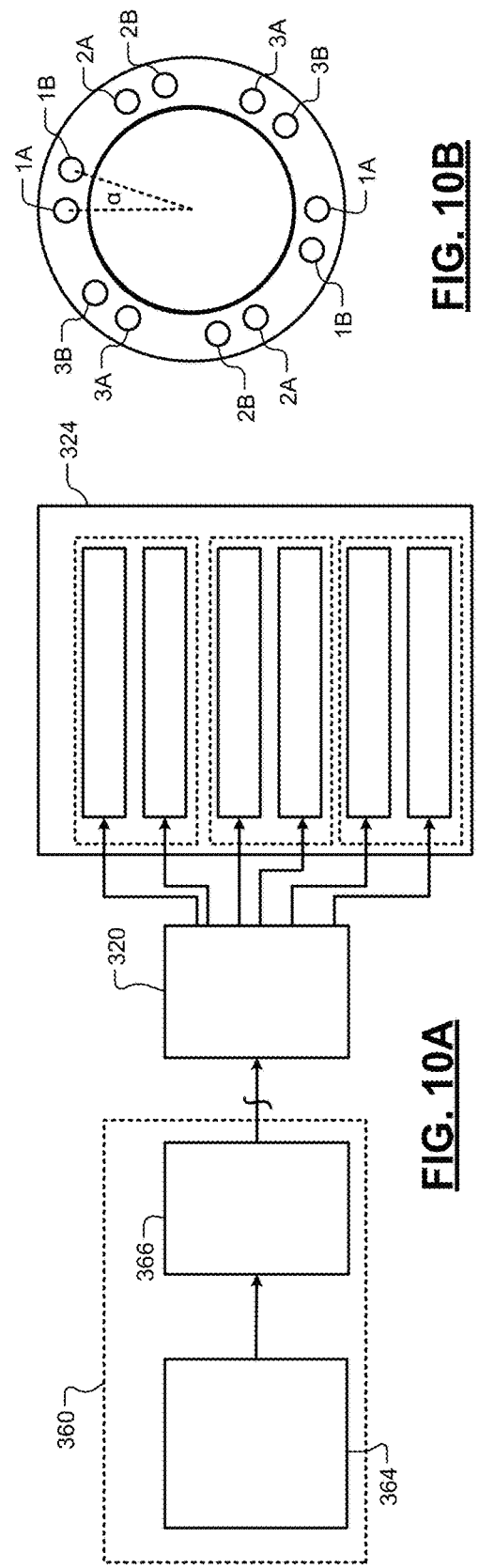

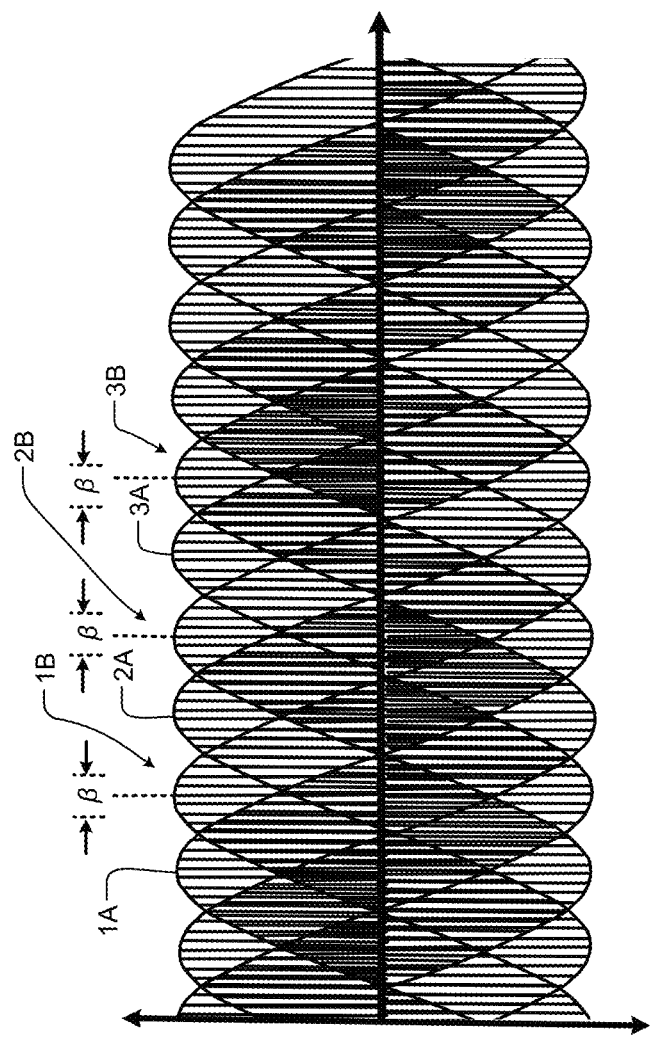

SYSTEMS AND METHODS FOR REDUCING BATTERY RIPPLE LOSS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to power control systems and drive units for electric vehicles, and more particularly to power control systems and drive units for reducing battery ripple loss.

Electric vehicles (EVs) such as battery electric vehicles (BEVs), hybrid vehicles, and/or fuel cell vehicles include one or more electric machines and a battery system including one or more battery cells, modules and/or packs.

A power control system is used to control charging and/or discharging of the battery system during charging and/or driving. The power control system includes a power inverter that is arranged between the battery system and the electric machine. The power inverter typically includes a DC capacitor connected in parallel across an input thereof. During operation of the electric vehicle, the DC capacitor is initially charged and then the DC capacitor helps the battery system to absorb and release transient pulses or ripple components of energy during operation.

Pulse width modulation (PWM) is used to control an array of switches of the power inverter. In other words, the switches are turned on and off quickly to produce pulses of current and to vary voltage applied to the stator windings of the electric machines. A fundamental component of the current pulses produces torque in the electric machine. The other components of the current pulses generate ripple current on the DC side of the power bus. The ripple current increases ripple loss of the battery system.

DC capacitors are used to absorb and release ripple current. High ripple current on the DC side of the power bus generally requires the use of large DC capacitors to adequately minimize the ripple current. However, the size of the DC capacitor needs to be reduced to reduce cost and increase the power density of the power inverter and drive system.

SUMMARY

A power control system for an electric vehicle comprises N power inverters configured to connect to a battery system of the electric vehicle. Each of the N power inverters includes a plurality of power switches, where N is an integer greater than one. The N power inverters are configured to connect to stator phase windings of N electric machines, respectively. A controller is configured to determine a switching frequency for the N electric machines and (N−1) phase offsets for (N−1) ones of the N electric machines, generate a set of pulse width modulation (PWM) switching signals at the switching frequency for a first one of the N power inverters, and output (N−1) sets of PWM switching signals to the (N−1) ones of the N electric machines based on the set of PWM switching signals and the (N−1) phase offsets.

In other features, the controller includes a frequency and phase generator configured to generate the switching frequency and the (N−1) phase offsets. The controller further includes N pulse width modulation generators configured to generate the set of PWM switching signals and the (N−1) sets of PWM switching signals, respectively. N capacitors are connected across inputs of the N power inverters, respectively.

In other features, M capacitors connected across inputs of the N power inverters, where M is an integer greater than zero and less than N. The plurality of power switches of each of the N power inverters includes P first power switches including first terminals configured to connect to a first terminal of the battery system, where P is an integer; P second power switches including first terminals connected to second terminals of the P first power switches, respectively, and configured to connect to P phase windings of a corresponding one of the N electric machines; and second terminals of the P second power switches configured to connect to a second terminal of the battery system.

In other features, the controller is further configured to adjust the phase offset based on vehicle operating conditions. The phase offset is in a range from 90° to 180° electrical.

A drive unit for an electric vehicle, comprises a power inverter including a plurality of power switches. An electric machine is connected to the power inverter and including a stator including plurality of phase windings and a rotor that rotates relative to the stator. Each of the plurality of phase windings of the stator is segmented into first stator segments and second stator segments. The second stator segments have an alignment offset relative to the first stator segments. A controller is configured to determine a switching frequency and a phase offset for the electric machine; generate a first set of pulse width modulation (PWM) switching signals at the switching frequency for first ones of the plurality of power switches connected to the first stator segments of the plurality of phase windings; and generate a second set of PWM switching signals for second ones of the plurality of power switches connected to the second segments of the plurality of phase windings. The second set of PWM switching signals are based on the first set of PWM switching signals and the phase offset.

In other features, the plurality of power switches of the power inverter includes 2P first power switches including first terminals connected to a first terminal of a battery system, where P is equal to a number of phases of the electric machine; and 2P second power switches including first terminals connected to second terminals of the 2P first power switches, respectively, and to the first stator segments and the second stator segments of the plurality of phase windings. Second terminals of the 2P second power switches are connected to a second terminal of the battery system. P is equal to 3. The alignment offset is in a range from 30° to 60° electrical and wherein the phase offset is in a range from 90° to 180° electrical.

In other features, the controller is further configured to adjust the phase offset based on vehicle operating conditions.

A drive unit for an electric vehicle includes N electric machines each including a stator including stator windings and a rotor, where N is an integer greater than one. The stator windings of the stators of each of the N electric machines have an alignment offset relative to others of the N electric machines. N power inverters configured to connect to a battery system of the electric vehicle, wherein each of the N power inverters includes a plurality of power switches, and wherein the N power inverters are configured to connect to the stator windings of the N electric machines, respectively. A controller is configured to determine a switching frequency for the N electric machines and (N−1) phase offsets for (N−1) ones of the N electric machines, generate a set of pulse width modulation (PWM) switching signals at the switching frequency for a first one of the N power inverters, and output (N−1) sets of PWM switching signals to the (N−1) ones of the N electric machines based on the set of PWM switching signals and the (N−1) phase offsets.

In other features, the N electric machines are arranged in a common housing. Rotors of the N electric machines are connected to and fixed for rotation with a shaft. The controller includes a frequency and phase generator configured to generate the switching frequency and the (N−1) phase offsets. N pulse width modulation generators are configured to generate the set of PWM switching signals and the (N−1) sets of PWM switching signals, respectively.

In other features, the plurality of power switches of each of the N power inverters includes P first power switches including first terminals configured to connect to a first terminal of a battery system, where P is an integer equal to a number of phases of the electric machine; P second power switches including first terminals connected to second terminals of the P first power switches, respectively, and configured to connect to P phase windings of a corresponding one of the N electric machines. Second terminals of the P second power switches configured to connect to a second terminal of the battery system.

In other features, the phase offset is in a range from 90° to 180° electrical and wherein the alignment offset is in a range from 30° to 60° electrical. The controller is further configured to adjust the phase offset based on vehicle operating conditions.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a functional block diagram of an example of a vehicle including two drive units according to the present disclosure;

FIG. 2 is a functional block diagram of an example of a vehicle including three drive units according to the present disclosure;

FIG. 3 is a functional block diagram of an example of a power control system according to the present disclosure;

FIG. 4 is a flowchart of an example of a method for operating the control system;

FIG. 7 is a graph illustrating an example of switching signals for upper switches of the first and second drive units with a switching offset $dt_{sw}$ according to the present disclosure;

FIGS. 8A and 8B are graphs illustrating examples of DC link current ripple during operation without phase offset timing and with phase offset timing according to the present disclosure;

FIGS. 9 and 10A are functional block diagrams of an example of a power control system for an electric machine including segmented stator windings according to the present disclosure;

FIG. 10B is a side cross-sectional view of a stator including segmented stator windings;

FIG. 10C is a graph illustrating an example of current of upper switches with segmented stator windings with PWM phase offset according to the present disclosure;

In the drawings, reference numbers may be reused to identify similar and/or identical elements.

DETAILED DESCRIPTION

Figure 5:
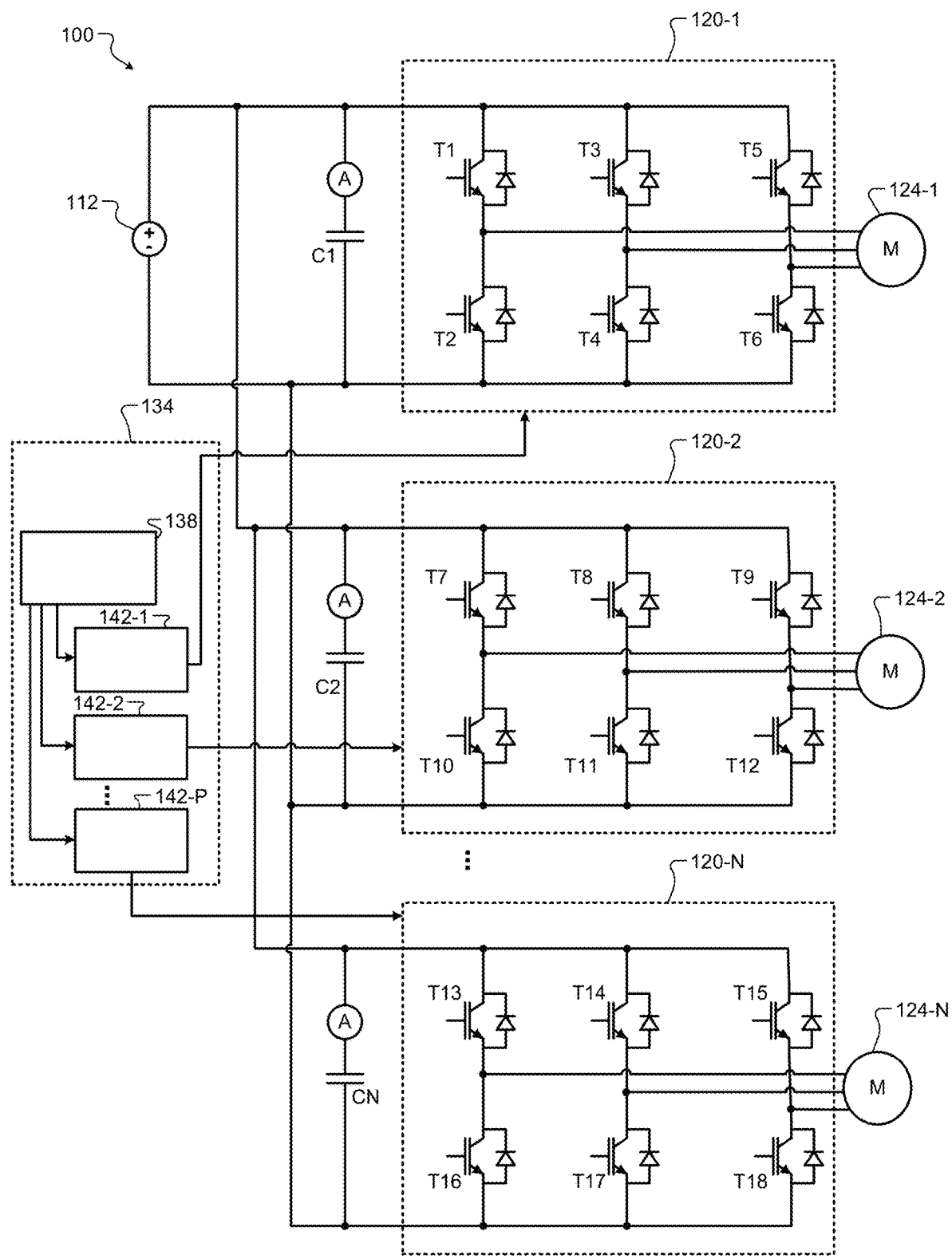
FIG. 5 is a more detailed functional block diagram of an example of a power control system according to the present disclosure.

Electric vehicles may include multiple electric machines and power inverters. Normally, separate drive unit controllers (that do not communicate) are used to generate the PWM signals that are output to power inverters of the drive units. During operation, the switching frequencies of the power inverters may or may not be synchronized from one power inverter to another.

During some driving conditions, the desired torque may be split equally between the electric machines. In other driving conditions, the desired torque may be split unequally between the electric machines. If the pulses of current that are supplied by the battery system to the electric machines occur at the same time, the current supplied by the battery system is equal to the sum of the currents supplied to each electric machine. As a result, the power control system needs to be designed to supply the worst-case combined current load and handle the worst-case ripple current that may occur in response to the combined current that can be supplied to the electric machines. Since the ripple current increases with the magnitude of the supplied current, the size of the DC capacitors also needs to be supplied for the worst-case ripple current.

Depending upon how the power inverters are packaged, each of the power inverters may include a dedicated DC capacitor connected at its input terminals. If the packaging of two or more of the power inverters is combined, it is possible that one or more of DC capacitors can be shared by more than one power inverter. In other words, less than a one-to-one relationship can occur.

Reducing ripple current reduces power loss. To increase the power density of the power inverter and the drive system, it is also desirable to reduce the size of the DC capacitor(s). The systems and methods described below decrease ripple current, which reduces ripple current losses and/or enables the use of smaller DC capacitors.

In some of the examples described below, the power control system and methods according to the present disclosure synchronize the switching frequency for multiple power inverters (corresponding to multiple electric machines) and apply a phase offset between the PWM signals for the power switches in the different power inverters. In other words, the PWM signals output to the power switches of the power inverters are synchronized and have a phase offset. The use of this control approach reduces current ripple-related losses in an EV propulsion system. In other words, the electric machines are operated at the same frequency and the PWM signals have a phase offset to reduce the occurrence of overlapping current pulses, which reduces ripple current. In some examples, the phase offset is in a range from 90 to 180° electrical, although other offsets can be used.

In other examples, the EV includes one or more electric machines with phase windings that are segmented into two stator winding segments. The stator segments of each phase are located on the stator with an alignment offset. In some examples, the alignment offset is in a range from 30 to 60° electrical to reduce low frequency ripple current. Phase-offset PWM signals are output to the first and second stator winding segments of the phase windings to reduce high frequency ripple current.

In other examples, the stator windings of multiple electric machines have an alignment offset to provide an optimum phase shift between the fundamental frequency components of the electric machines and to minimize low frequency ripple currents. In other words, the stator windings of one electric machine of the EV are offset relative to the stator windings of another electric machine of the EV. In some examples, the multiple electric machines are housed in a common housing and the rotors drive a common shaft.

Referring now to FIGS. 1-3, electric vehicles (EVs) can include more than one drive unit. In FIG. 1, a vehicle 10 includes wheels 12, a first drive unit 14-1 driving a front set of the wheels 12 through a front driveline 18. A second drive unit 14-2 drives a rear set of the wheels 12 through a rear driveline 16. The first drive unit 14-1 and the second drive unit 14-2 each include an electric machine and a power inverter.

In FIG. 2, the vehicle 10 includes the wheels 12, the first drive unit 14-1 driving the front set of the wheels 12 through the front driveline 18, and second and third drive units 14-2 and 14-3 driving the wheels 12 in the rear, respectively. The first drive unit 14-1, the second drive unit 14-2 and the third drive unit 14-3 each include an electric machine and a power inverter. While the examples in FIGS. 1 and 2 include 2 and 3 electric machines, respectively, the EV may include additional or fewer electric machines.

As will be described further below, the drive units 14 of FIGS. 1 and 2 are powered by the same high voltage DC supply. In FIG. 3, a controller 30 of the EV generates PWM signals that drive power switches in the inverter modules forming part of the first drive unit 14-1, the second drive unit 14-2 and an $N^{th}$ drive unit 14-N, where N is an integer. The controller 30 may generate one PWM signal and adjust the PWM signal by the phase offset(s) or the controller 30 may generate different PWM signals that directly incorporate the phase offset(s).

In some prior systems, the controller(s) generate pulse width modulation (PWM) signals that are used to control states of switches in power inverters located in the drive units 14. When two or more of the electric machines are driven using synchronized PWM signals, high ripple current occurs due to DC link current harmonics. In some examples, the controller 30 according to the present disclosure generates PWM signals for one of the drive units (e.g. a master drive unit) and then uses a phase offset between the one drive unit and other drive units (slave drive units).

Referring now to FIG. 4, a method 50 for operating the power control system is shown. At 52, the phase offset is determined by optimizing ripple current for various EV operating conditions. In some examples, the phase offset for the various operating conditions is determined during vehicle calibration and programmed into a lookup table indexed by one or more vehicle operating conditions. In some examples, the operating point (e.g. modulation index and power factor) are functions of desired torque and motor speed.

At 54, the method generates PWM signals for one drive unit or electric machine and generates PWM signals for other drive units of the EV by adjusting the PWM signals by the corresponding phase offset. As can be appreciated, the phase offset that is used may be varied depending on vehicle operating conditions such as vehicle speed, load, driver intent, etc.

Referring now to FIG. 5, a power control system 100 includes a battery system 112 having a first terminal and a second terminal. The battery system 112 includes one or more battery cells, modules and/or packs that are connected in series or parallel. In some examples, the battery system operates at high voltage such as 400V or 800V, although other voltages can be used. The first and second terminals of the battery system 112 are connected to power inverters 120-1, 120-2, . . . and 120-N, where N is an integer greater than one.

The power inverter 120-1 includes 2P power switches where P is the number of phases. In this example, the motor is a three-phase motor (P=3). However, additional phases can be used. The power inverter 120-1 includes power switches T1, T2, T3, T4, T5, and T6. The power switches T1, T2 and T3 are connected to the first terminal of the battery system 112 and a first terminal of the capacitor C1. Second terminals of the power switches T1, T2 and T3 are connected to first, second and third phases of the electric machine 124-1, respectively, and to first terminals of the power switches T4, T5 and T6, respectively. Second terminals of the power switches T4, T5 and T6 are connected to the second terminal of the battery system 112 and the second terminal of the capacitor C1.

The power inverter 120-2 includes power switches T7, T8, T9, T10, T11 and T12. First terminals of power switches T7, T8, and T9 are connected to the first terminal of the battery system 112 and a first terminal of the capacitor C2. Second terminals of the power switches T7, T8, and T9 are connected to first, second and third phases of the electric machine 124-2, respectively, and to first terminals of the power switches T10, T11 and T12, respectively. Second terminals of the power switches T10, T11 and T12 are connected to the second terminal of the battery system 112 and the second terminal of the capacitor C2.

The power inverter 120-N includes power switches T13, T14, T15, T16, T17 and T18. First terminals of power switches T13, T14, and T15 are connected to the first terminal of the battery system 112 and a first terminal of the capacitor C3. Second terminals of the power switches T13, T14, and T15 are connected to first, second and third phases of the electric machine 124-N, respectively, and to first terminals of the power switches T16, T17 and T18, respectively. Second terminals of the power switches T16, T17 and T18 are connected to the second terminal of the battery system 112 and the second terminal of the capacitor CN.

A controller 134 includes a frequency and phase offset generator 138 and PWM generators 142-1, 142-2, . . . , and 142-N. The frequency and phase offset generator 138 determines a switching frequency of a master PWM signal and one or more phase offset(s) from the master PWM signal. The PWM generator 142-1 generates a first PWM signal for the power inverter 120-1. The PWM generator 142-2 generates a second PWM signal for the power inverter 120-2 by adjusting the first PWM signal by the corresponding phase offset. The PWM generator 142-N generates an $N^{th}$ PWM signal for the power inverter 120-N by adjusting the first PWM signal by the corresponding phase offset.

Figure 6:
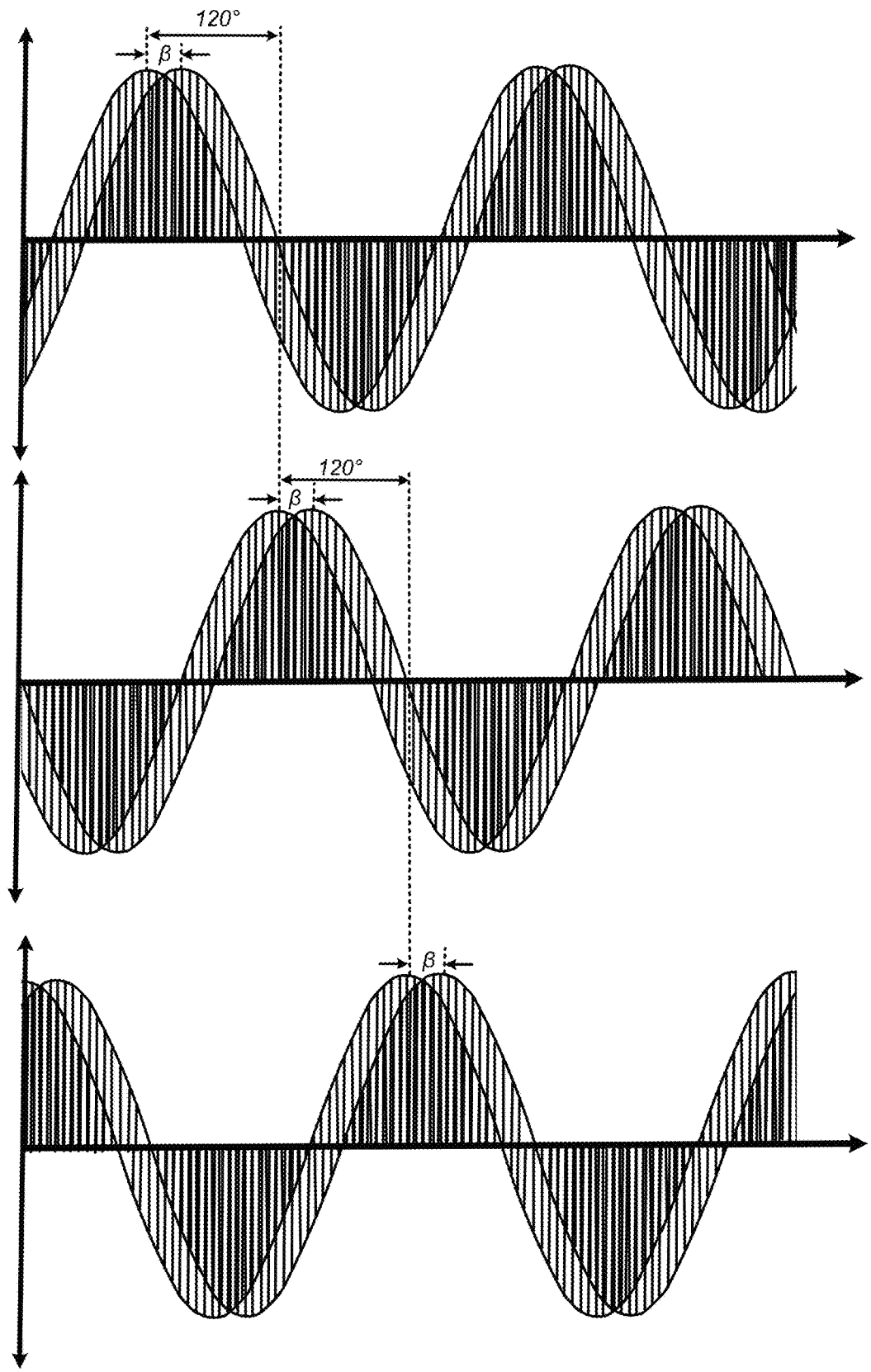
FIG. 6 is a graph illustrating an example of current of upper switches of first and second drive units with a phase offset according to the present disclosure.

Referring now to FIG. 6, current of upper switches of first and second drive units are shown with a PWM phase offset β. As mentioned above, the PWM phase offset β can be static or can vary based on operating conditions. In the upper graph, first upper switches (T1 and T7 in FIG. 5 where N=2) of the first and second drive units are shown. In the middle graph, second upper switches (T2 and T8 in FIG. 5 where N=2) of the first and second drive units are shown. In the bottom graph, third upper switches (T3 and T9 in FIG. 5 where N=2) of the first and second drive units are shown. The PWM phase offset β reduces DC link current harmonics, which reduces power loss.

Referring now to FIG. 7, switching signals for upper switches (e.g. T1 to T3 and T7 to T9 in FIG. 5 where N=2) of the first and second drive units with a switching offset $dt_{sw}$ are shown. The switching offset $dt_{sw}$ is determined by a difference between a center of switching signals for the first drive unit relative to a center of the switching signals for a corresponding power switch of the second drive unit. In some examples the switching offset $dt_{sw}$ is in a range from 90° to 180° electrical, although other values can be used.

Referring now to FIGS. 8A and 8B, DC link current ripple is shown during operation without phase offset timing and with phase offset timing, respectively. In FIG. 8A, the DC link current ripple is shown without phase offset timing and have an estimated power loss of 1054 W. In FIG. 8B, the DC link current ripple is shown with 90° electrical phase shift and have an estimated power loss of 427 W, which is a reduction of about 60%. By comparison, a 20 W loss over the FTP City Cycle is equivalent to a loss of 1.5 mi city range.

Referring now to FIGS. 9, 10A and 10B, a power control system 300 includes a battery system 312 and a power inverter 320 including switches. The stator windings for the phases of the electric machine 124-1 are segmented. In other words, each of the stator windings is segmented and are rotationally offset in the stator housing. For example, the stator may include two pairs of stator slots for each phase winding that have an alignment offset.

The first and second stator segments for the phase windings are also driven with a PWM phase offset as describe above. In other words, half of the phase current is output to one stator segment and the other half of the phase current is output to the other stator segment that has an alignment offset by 30-60° electrical to reduce low frequency ripple current. In addition, PWM phase offset is also used between the first and second stator segments as described above to reduce high frequency ripple current.

The power inverter 320 includes power switch pairs T1A and T1B, T2A and T2B, T3A and T3B, T4A and T4B, T5A and T5B, and T6A and T6B for driving segmented stator windings of the first phase, the second phase and the third phase of the electric machine. First terminals of power switches T1A and T1B, T2A and T2B, and T3A and T3B are connected to the first terminal of the battery system 312 and a first terminal of the capacitor C1. Second terminals of the power switches T1A and T1B, T2A and T2B, and T3A and T3B are connected to segmented stator windings (1A, 1B, 2A, 2B, 3A and 3B) of the electric machine 324, respectively, and to first terminals of the power switches T4A and T4B, T5A and T5B, and T6A and T6B, respectively. Second terminals of the power switches T4A and T4B, T5A and T5B, and T6A and T6B are connected to the second terminal of the battery system 312 and the second terminal of the capacitor C1.

In FIG. 10A, a controller 360 includes a frequency and phase generator 364 and a PWM generator 366. The PWM generator 366 drives pairs of power switches of the power inverter 320. Power switch pairs T1A and T1B, T2A and T2B, T3A and T3B, T4A and T4B, T5A and T5B, and T6A and T6B are driven with a phase offset as described above. In other words, the power switch T1A is driven by a first PWM signal for the first phase and the power switch T1B is driven the first PWM signal with a phase offset (or two separate PWM signals for the first phase that differ by the phase offset).

Likewise, the power switch T2A is driven by a second PWM signal for the second phase and the power switch T2B is driven the second PWM signal with the phase offset (or two separate PWM signals for the second phase that differ by the phase offset). The power switch T3A is driven by a third PWM signal for the third phase and the power switch T3B is driven the third PWM signal with the phase offset (or two separate PWM signals for the third phase that differ by the phase offset).

In FIG. 10B, an example of a segmented stator of an electric machine is shown. The segmented phase windings for a given phase (e.g. 1A and 1B, 2A and 2B and 3A and 3B) are separated by an electrical phase offset α of 30° to 60° electrical. The use of the segmented windings with an alignment phase offset further reduces low frequency ripple current. Use of the PWM phase offset reduces high frequency ripple.

In FIG. 10C, the current is shown for the segmented phases. As can be appreciated, the PWM phase offset β can be varied based on operating conditions to reduce current ripple as described above.

Figure 11A:
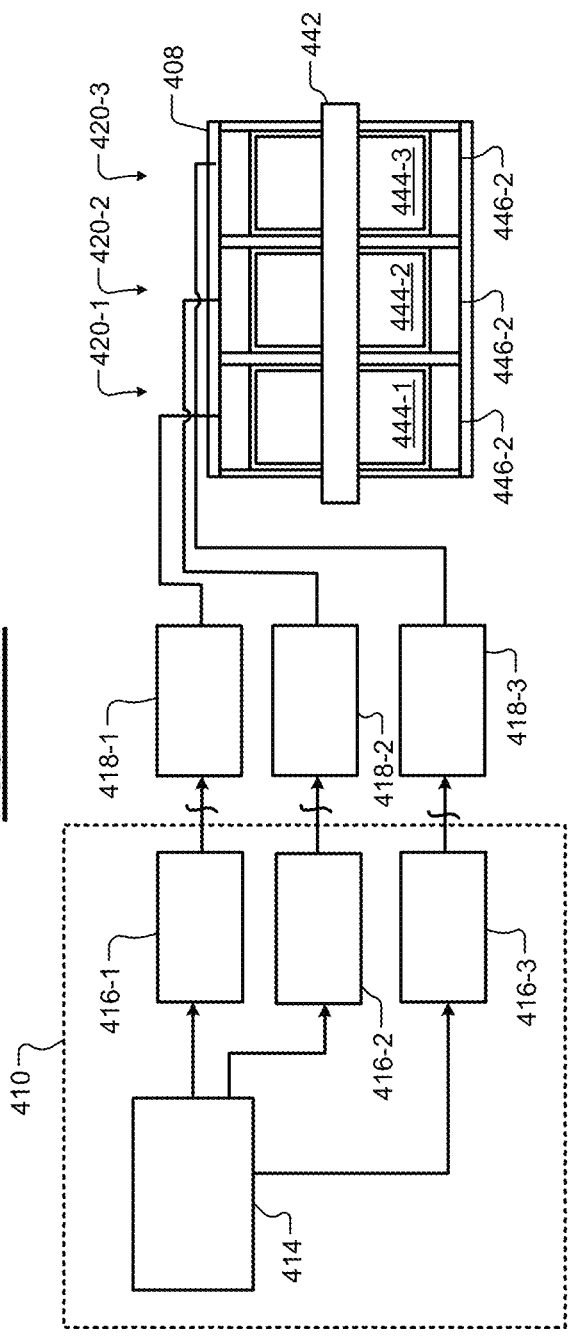
FIG. 11A is a functional block diagram of multiple electric machines with stators having an alignment offset according to the present disclosure.
Figure 11B:
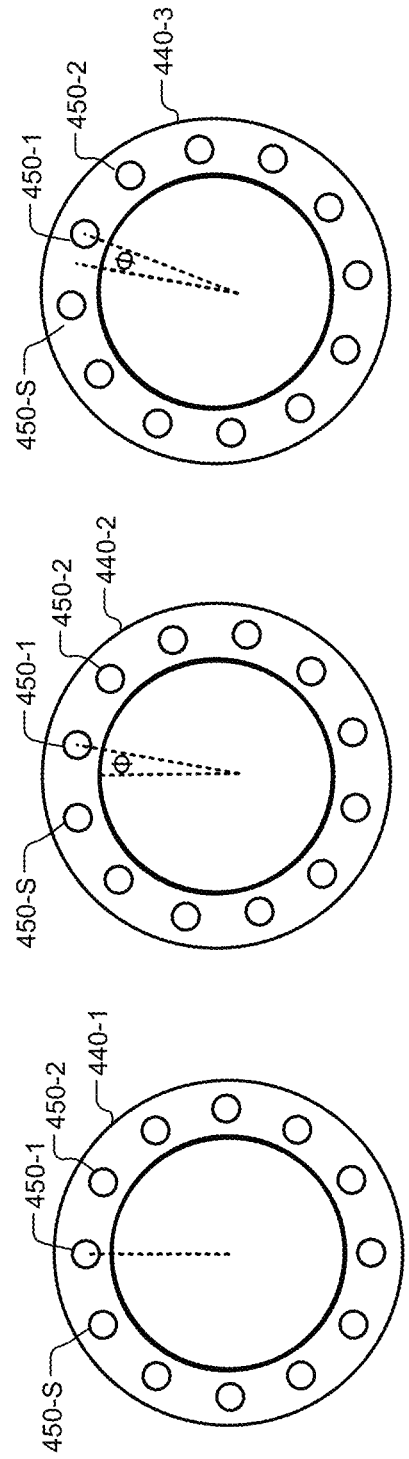
FIG. 11B are side cross-sectional views of stators of electric machines including alignment offsets.

Referring now to FIGS. 11A and 11B, an electric vehicle includes multiple electric machines that are arranged in a common housing and drive a common output shaft. The stator windings of the electric machines have an alignment offset. In other words, the windings of a stator of one electric machine are rotated by an alignment offset ϕ relative to the windings of the stators of the other electric machines (as shown in FIG. 11B). In some examples, the alignment offset ϕ is in a range from 30 to 60° electrical to reduce low frequency ripple current. In addition, the electrical machines are driven with a PWM phase offset therebetween as described above to reduce high frequency ripple current.

In FIG. 11A, a controller 410 includes a frequency generator 414 and PWM generators 416-1, 416-2, and 416-3 (collectively PWM generators 416) (while three electric machines are shown, additional or fewer can be used). The PWM generators 416 control switches of power inverters 418-1, 418-2, and 418-3 (collectively power inverters 418). The power inverters 418-1, 418-2, and 418-3 control the supply of current to electric machines 420-1, 420-2, and 420-3 (collectively electric machines 420). While three electric machines 420 are shown, two or more electric machines 420 can be used.

Stators 446-1, 446-2, and 446-3 of the electric machines 420 have different alignment with respect to one another (as can be seen in FIG. 11B). The alignment offset is selected to minimize 6× the fundamental frequency ripple current on the dc side. Rotors 444-1, 444-2, and 444-3 (collectively rotors 444) are attached to a common shaft 442.

In other words, the windings of the stator 446-2 of the electric machine 420-2 is electrically rotated by a phase shift ϕ relative to the windings 446-1 of the stator of the electric machine 420-1. Likewise, the windings of the stator 446-3 of the electric machine 420-3 is electrically rotated by a phase shift φ relative to the windings of the stator 446-2 of the electric machine 420-2.

In FIG. 11B, stators 440-1 and 440-2 are shown to have an alignment offset φ between the stator windings 450-1, 450-2, . . . , and 450-S of the stator 440-1 of the electric machine 420-1 and the stator windings 450-1, 450-2, . . . , and 450-S of the stator 440-2 of the electric machine 420-2 (where S is an integer greater than one). As can be appreciated, the alignment offset reduces low frequency ripple current and the PWM phase offset reduces high frequency ripple current.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for an electric vehicle, comprising:
   N power inverters configured to connect to a battery system of the electric vehicle; and
   one or more electric machines connected to the N power inverters, each electric machine including a stator having a plurality of phase windings,
   wherein each of the plurality of phase windings is segmented into first stator segments and second stator segments, and the second stator segments have an alignment offset relative to the first stator segments,
   wherein each of the N power inverters includes a plurality of power switches, where N is an integer greater than one, and
   a controller configured to:
      determine a switching frequency for the one or more electric machines,
      output a first set of pulse width modulation (PWM) switching signals at the switching frequency for first ones of the plurality of power switches connected to the first stator segments of the plurality of phase windings,
      determine a phase offset for second ones of the plurality of power switches connected to the second stator segments of the plurality of phase windings based on the first set of PWM switching signals for the first ones of the plurality of power switches, and
      output a second set of PWM switching signals for the second ones of the plurality of power switches connected to the second stator segments of the plurality of phase windings based on the first set of PWM switching signals and the phase offset.

2. The power control system of claim 1, wherein the controller includes a frequency and phase generator configured to generate the switching frequency and the phase offset.

3. The power control system of claim 2, wherein the controller further includes pulse width modulation generators configured to generate the first set of PWM switching signals and the second set of PWM switching signals.

4. The power control system of claim 1, further comprising N capacitors connected across inputs of the N power inverters, respectively.

5. The power control system of claim 1, further comprising M capacitors connected across inputs of the N power inverters, where M is an integer greater than zero and less than N.

6. The power control system of claim 1, wherein the plurality of power switches of each of the N power inverters includes:
   P first power switches including first terminals configured to connect to a first terminal of the battery system, where P is an integer;
   P second power switches including first terminals connected to second terminals of the P first power switches, respectively; and
   second terminals of the P second power switches configured to connect to a second terminal of the battery system.

7. The power control system of claim 6, wherein the controller is further configured to adjust the phase offset based on vehicle operating conditions.

8. The power control system of claim 1, wherein the phase offset is in a range from 90° to 180° electrical.

9. A drive unit for an electric vehicle, comprising:
   a power inverter including a plurality of power switches;
   an electric machine connected to the power inverter and including a stator including a plurality of phase windings and a rotor that rotates relative to the stator,
   wherein each of the plurality of phase windings of the stator is segmented into first stator segments and second stator segments, and wherein the second stator segments have an alignment offset relative to the first stator segments; and
   a controller configured to:
      determine a switching frequency for the electric machine;
      generate a first set of pulse width modulation (PWM) switching signals at the switching frequency for first ones of the plurality of power switches connected to the first stator segments of the plurality of phase windings;
      determine a phase offset for second ones of the plurality of power switches connected to the second stator segments of the plurality of phase windings based on the first set of PWM switching signals for the first ones of the plurality of power switches; and
      generate a second set of PWM switching signals for the second ones of the plurality of power switches connected to the second stator segments of the plurality of phase windings, wherein the second set of PWM switching signals are based on the first set of PWM switching signals and the phase offset.

10. The drive unit of claim 9, wherein the plurality of power switches of the power inverter includes:
    2P first power switches including first terminals connected to a first terminal of a battery system, where P is equal to a number of phases of the electric machine; and
    2P second power switches including first terminals connected to second terminals of the 2P first power switches, respectively, and to the first stator segments and the second stator segments of the plurality of phase windings,
    wherein second terminals of the 2P second power switches are connected to a second terminal of the battery system.

11. The drive unit of claim 10, wherein P is equal to 3.

12. The drive unit of claim 9, wherein the alignment offset is in a range from 30° to 60° electrical and wherein the phase offset is in a range from 90° to 180° electrical.

13. The drive unit of claim 9, wherein the controller is further configured to adjust the phase offset based on vehicle operating conditions.

14. An electric vehicle, comprising:
N electric machines each including a stator having a plurality of phase windings and a rotor, where N is an integer greater than one, wherein each of the plurality of phase windings is segmented into first stator segments and second stator segments, and the second stator segments have an alignment offset relative to the first stator segments;
N power inverters configured to connect to a battery system, wherein each of the N power inverters includes a plurality of power switches, and wherein the N power inverters are configured to connect to the phase windings of the N electric machines, respectively; and
a controller configured to:
- determine a switching frequency for the N electric machines,
- generate a first set of pulse width modulation (PWM) switching signals at the switching frequency for first ones of the plurality of power switches connected to the first stator segments of the plurality of phase windings,
- determine a phase offset for second ones of the plurality of power switches connected to the second stator segments of the plurality of phase windings based on the first set of PWM switching signals for the first ones of the plurality of power switches, and
- generate a second set of PWM switching signals for the second ones of the plurality of power switches connected to the second stator segments of the plurality of phase windings based on the first set of PWM switching signals and the phase offset.

15. The electric vehicle of claim 14, wherein the phase offset is in a range from 90° to 180° electrical and wherein the alignment offset is in a range from 30° to 60° electrical.

16. The electric vehicle of claim 14, wherein the controller is further configured to adjust the phase offset based on vehicle operating conditions.

17. The electric vehicle of claim 14, wherein the plurality of power switches of each of the N power inverters includes:
P first power switches including first terminals configured to connect to a first terminal of the battery system, where P is an integer equal to a number of phases of the N electric machines;
P second power switches including first terminals connected to second terminals of the P first power switches, respectively; and
second terminals of the P second power switches configured to connect to a second terminal of the battery system.

18. The electric vehicle of claim 17, wherein the N electric machines are arranged in a common housing.

19. The electric vehicle of claim 18, wherein rotors of the N electric machines are connected to and fixed for rotation with a shaft.

20. The electric vehicle of claim 17, wherein the controller includes:
a frequency and phase generator configured to generate the switching frequency and the phase offset; and
pulse width modulation generators configured to generate the first set of PWM switching signals and the second set of PWM switching signals.

* * * * *